J. R. McGIFFERT.
MACHINE FOR LOGGING.
APPLICATION FILED SEPT. 15, 1909.
964,535.
Patented July 19, 1910.
4 SHEETS—SHEET 1.
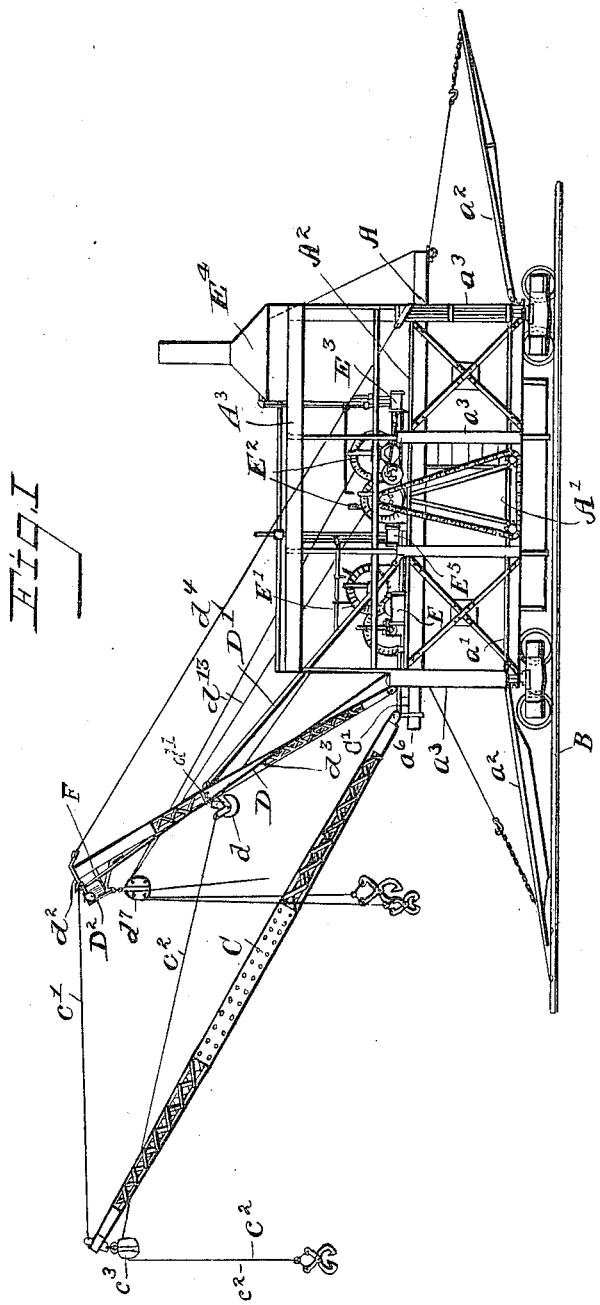
Witnesses:
J. C. Turner
Jno. F. Oberlin
Inventor.
John R. McGiffert
by J. B. Fay
Attorney.

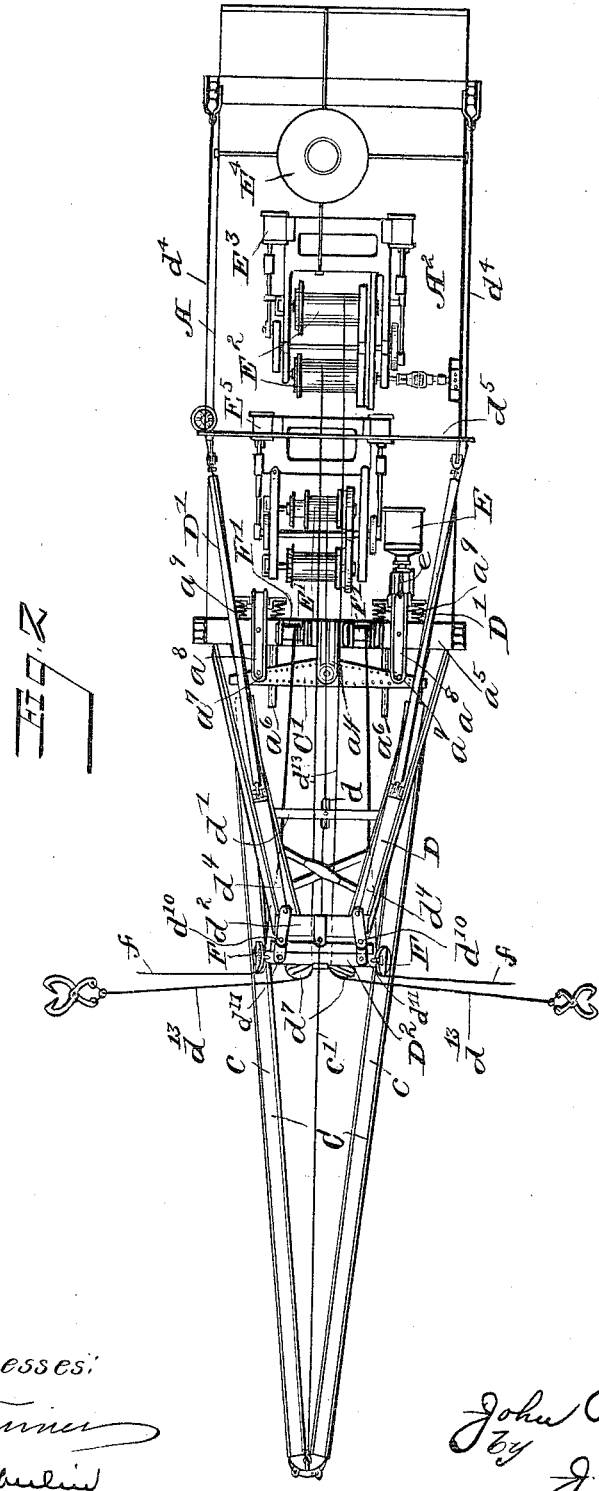

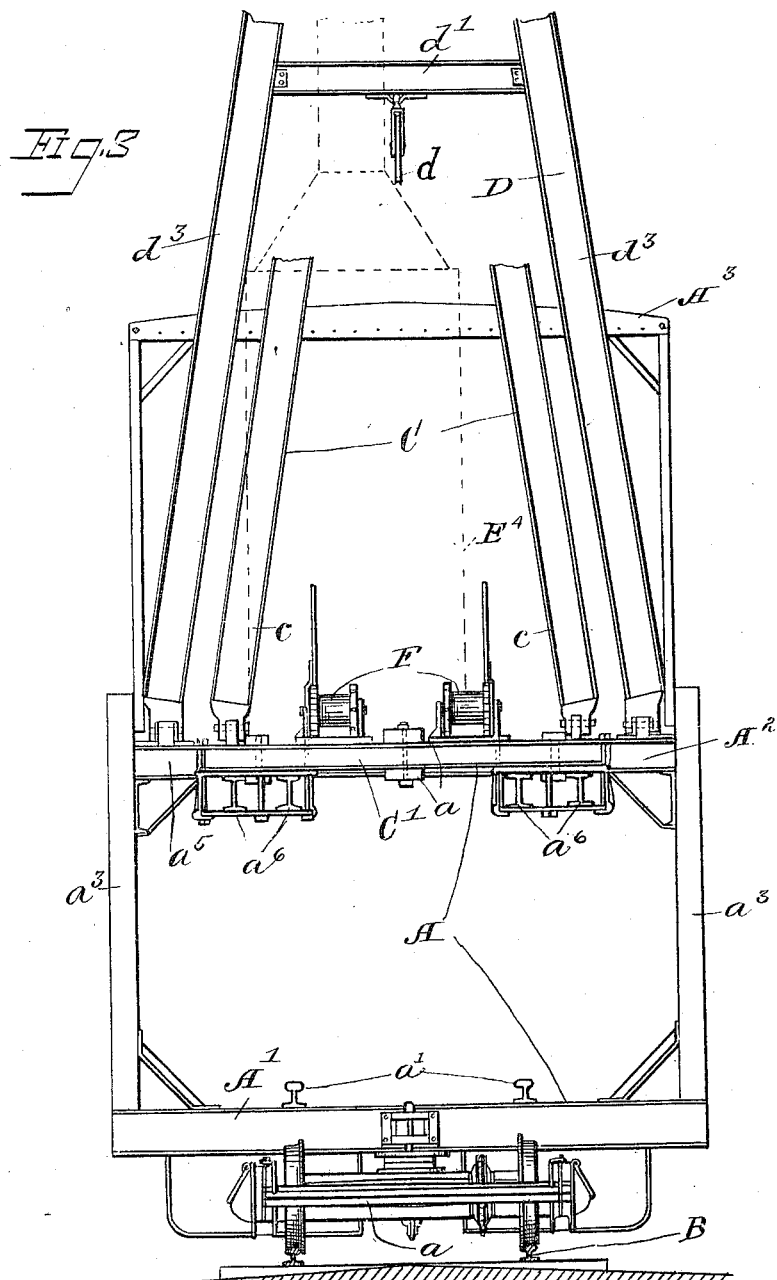

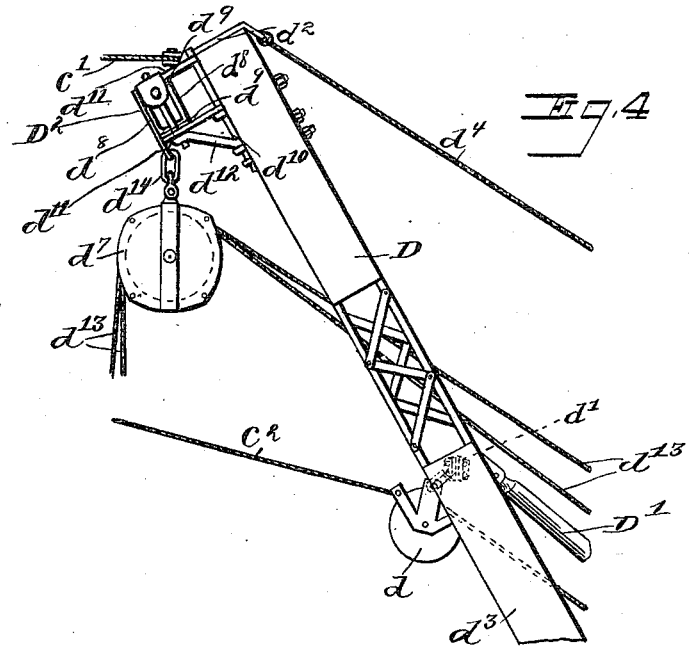
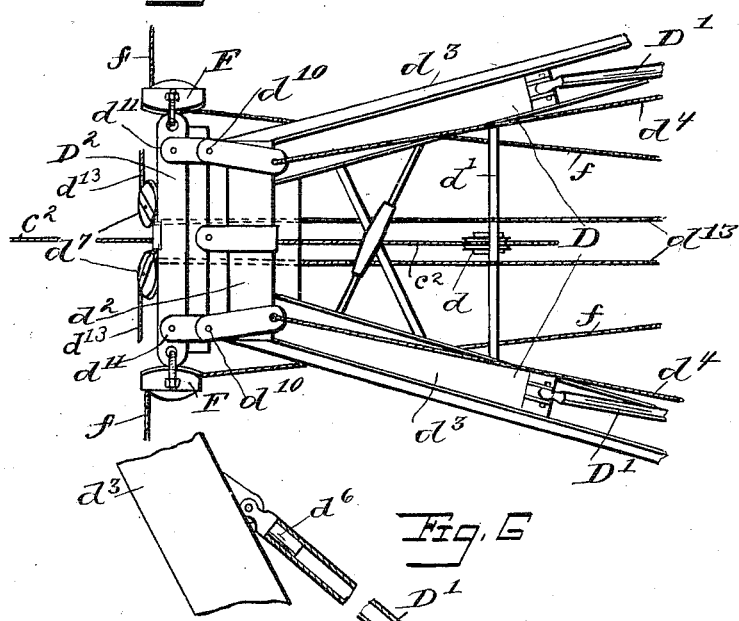
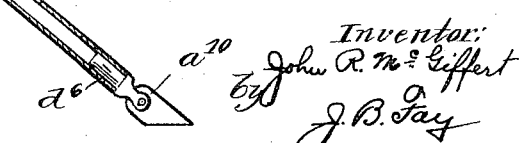

UNITED STATES PATENT OFFICE.

JOHN R. McGIFFERT, OF DULUTH, MINNESOTA, ASSIGNOR TO CLYDE IRON WORKS, OF DULUTH, MINNESOTA, A CORPORATION OF MINNESOTA.

MACHINE FOR LOGGING.

964,535. Specification of Letters Patent. Patented July 19, 1910.

Application filed September 15, 1909. Serial No. 517,796.

*To all whom it may concern:*

Be it known that I, JOHN R. McGIFFERT, a citizen of the United States, and a resident of Duluth, county of St. Louis, and State of Minnesota, have invented a new and useful Improvement in Machines for Logging, of which the following is a specification, the principle of the invention being herein explained and the best mode in which I have contemplated applying that principle, so as to distinguish it from other inventions.

The present invention relates to a logging machine adapted to combine the operations of skidding and loading, these operations having generally heretofore been performed by separate machines. In so far as the general structural features of the machine are concerned, they follow those of the so-called "Decker" loader which will be found described in U. S. Letters Patent No. 621,043, dated March 14, 1899.

The object of the present invention, then, is the provision of combined skidding and loading means for use on a structure of this type, with a view to rendering easier and more expeditious, the handling of logs in the forest, and the placing of them onto cars for transportation thence.

To the accomplishment of these and related objects, said invention, then, consists of the means hereinafter fully described, and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—Figure 1 is a side elevational view of a combined skidding and loading machine embodying my several improvements; Fig. 2 is a plan view thereof; Fig. 3 is a front elevational view of the machine on a larger scale, and with the upper portions of the boom broken away; Fig. 4 is a side elevation on a larger scale of the upper end of the skidding boom; Fig. 5 is a plan view of the same; and Fig. 6 is a partial side elevation and partial section of one of two braces employed in connection with said skidding boom.

As has been indicated, in its general lines, the machine of the drawings, follows those of the "Decker" loader. It is not meant, however, by this, to imply that the invention may not be carried upon a different construction of frame if desired, such as for instance that of the "McGiffert" loader. Referring, however, to the construction illustrated, the frame proper of the machine will be seen to comprise a double decked structure A, supported at either end upon trucks $a$ adapted to run on a railroad track B. The lower deck $A^1$ of the frame, is hung as close to the ground as possible and carries a section of track $a^1$ of the same gage as that upon which the machine as a whole is thus rendered movable. Pivotally attached to each end of the deck $A^1$, are supplementary track sections $a^2$ that are adapted to incline downwardly from said deck to such railway track B proper, thus rendering it possible to pass cars through the machine over such lower deck. The upper deck $A^2$, which thus obviously requires to be at an elevation above the lower deck, sufficient to permit the movement of cars just described, is supported by posts or columns $a^3$ forming the sides of the frame. It is upon such upper deck that the loading and skidding mechanism, providing the subject matter of present interest, is carried.

Referring first of all to the loading mechanism, this will be seen to comprise a swinging boom C that in a number of features closely resembles that forming the subject matter of my Patent No. 987,631, dated December 22, 1908. In other words, said boom is of general A-shape, the lower ends of its respective side members or legs $c$ being mounted upon an oscillating beam $C^1$ that is pivoted to a casting $a^4$ centrally secured to a transverse girder $a^5$ forming a part of the machine frame. The respective ends of said oscillating beam slidably rest upon longitudinally disposed beams $a^6$ in the upper deck that project forwardly from said frame a sufficient distance to include the range of movement of the beam $C^1$. Near each extremity of the latter, there is further pivotally attached by means of a pin $a^7$, a yoke $a^8$ of general U-form that embraces the girder $a^5$ above and below, and is movable backward and forward with respect to the same when the beam is swung or oscillated. On the back side of the girder are secured, intermediate of the same and yoke, suitable resilient means $a^9$ arranged to be compressed upon movement of the beam and thus constituting buffers therefor. In addition to such resilient means for limiting the oscillation of the beam, a cylinder E is provided with a piston $e$ reciprocable therein, and connected with one of the aforesaid yokes, and thus with the beam, by means of which cylinder and piston oscillation of the beam may be further controlled and, when desired, positively effected as well. Such cylinder will preferably be connected with the same boiler $E^4$ from which power is derived for operating the several winding drums that will be presently described.

While the lower ends of the side members $c$ of loading boom C are pivotally connected on a transverse axis with the oscillating beam $C^1$, said boom is designed to be maintained substantially in a fixed position vertically when the machine is set up. To this end it is supported at the desired angle of inclination with respect to the machine frame A, by means of a holding cable $c^1$ that extends rearwardly from its peak to the upper end of the skidding boom D, which for present purposes may be regarded as an inclined mast. The structure of the latter remains to be described, but it will be noted at this point that its upper end is located not only above but forwardly of the pivotal axis about which the lower end of the loading boom is oscillatory. As a result of this construction, the axis of oscillation of said loading boom is inclined from the vertical and the boom will accordingly normally manifest a tendency to swing toward a central position from either side, under the influence of gravity, thus assisting in the operation of loading logs from a position laterally of the railroad track onto a car standing upon said track.

The loading cable or line $c^2$, which is provided at its outer end (not shown) with log gripping means of usual construction, passes over a block $c^3$ suspended from the peak of said boom and over a block $d$ secured to a cross piece $d^1$ in the skidding boom to a winding drum $E^1$ located well forward on the upper deck of the machine, and provided with an independent engine for operating the same through clutch mechanism as usual. The block $d$ thus secured to the cross piece of the skidding boom, serves as a fair leader or guide for the loading line, so that it will run true on the loading drum despite the fact that the boom is swung from side to side in the fashion previously described.

The skidding boom D is likewise of general A-shape, although its outer end is not brought sharply to a peak, but is squared, being closed by a transverse member $d^2$ that connects the two side members $d^3$. The latter are adjustable about a transverse pivotal axis, preferably on the same transverse girder $a^5$ of the frame, from which the oscillating beam $C^1$ is supported. To retain said skidding boom in proper position, two holding lines $d^4$ are provided, extending from the boom's respective outer corners to the corresponding rear corners of the machine frame. A bar $d^5$, or the like, is interposed between these two holding lines to separate the same, so as to dispose them without the cab $A^3$ which is provided to inclose the mechanism mounted on the upper deck.

Inasmuch as there might be a tendency, under the considerable strain of the skidding lines, for the skidding boom to tilt backwardly, I furthermore brace said boom by two rods $D^1$ respectively pivotally attached to the side members of the boom, intermediately of the ends of the latter, and to pins $a^{10}$ on either side of the upper deck of the machine frame. The ends $d^6$ of these braces telescope, as indicated in Fig. 6, or, in other words, said braces are only effective against a rearward movement of the boom, its forward movement being restrained by the holding cables $d^4$. Accordingly, no strain will be placed on the center of the boom, in case such holding cables stretch. Otherwise, it will be seen that when the boom is pulled toward the front, as it usually is, owing to its weight, such weight added to that of the loading boom and the stress of the skidding and loading lines, would put a greater pull on said braces than they could be conveniently constructed to resist.

The skidding blocks $d^7$ are not supported directly from the upper end of the skidding boom, but are hung instead from a box-shaped piece $D^2$ formed in practice of two channels $d^8$ and two plates $d^9$, which piece or member is flexibly connected to the skidding boom, so as to permit it a certain amount of lateral movement, that is, movement lateral relatively to the machine itself, or longitudinally with respect to the transverse member $d^2$ forming the end of the boom. Such movable member $D^2$ is secured to the boom by means of two sets of links that are connected to transverse boom member $d^2$ by means of pins $d^{10}$, each set consisting of a pair of straight links $d^{11}$, one above and one below the movable member, and another set $d^{12}$ that is inclined with respect thereto. Said links $d^{12}$ thus form, in effect, brackets, when taken in connection with such straight links and the pivotal pins that connect the same with the boom D and member $D^2$, respectively. It should be noted that this arrangement not only permits the member $D^2$ to swing from side to side of the machine, up to the limit of the links just referred to, but also that said member is held away from the skidding boom so as to prevent the skidding blocks from coming in contact with the latter.

The skidding lines $d^{13}$, of which two are provided, pass over the blocks $d^7$ the latter being suspended by short links $d^{14}$ from said transversely movable member $D^2$. Said lines are provided at their outer ends with the usual tongs, while their inner ends are wound upon drums $E^2$ operated by an engine $E^3$, said skidding drums and engine being located to the rear of the winding drum $E'$ for the loading cable. In addition to said skidding blocks, two guying blocks F are secured to the same member $D^2$ one at each end, and guying lines $f$ are passed thereover and thence outwardly on either side of the boom, to suitable fixed points of attachment, such as stumps, trees or like objects. The inner ends of said guying lines are respectively wound upon guying drums $F^1$ mounted well forwardly on the machine frame, preferably upon the transverse girder $a^5$, one on each side of the casting $a^4$ that supports the oscillatory member $C^1$ of loading boom C.

By means of the foregoing machine, it will be seen that the operations of skidding in logs and loading the same onto cars, may be carried on simultaneously, since not only are separate booms provided for this purpose, but also independent operating means. Of course, either the loading boom or the skidding boom may be used without regard to the other, should occasion for such use arise. Not only are the respective booms thus operable simultaneously or independently of each other, as required, but by combining them in one structure, a number of advantageous results are secured, to which attention has in part been called in the preceding description.

It will be understood that the object in having the outer member of the skidding boom flexibly attached to the end of such boom is to eliminate the vibration of the machine due to irregularity of tension on the skidding line as logs are being hauled in. In the case of the loading boom, any such jar or vibration is taken up by the resilient means attached to the respective ends of the oscillating base of said boom, that operate in conjunction with the fluid pressure cylinder. The latter, in addition to subserving this purpose, is of course, used to swing said boom to the one side or the other, as occasion may demand, in order to grapple a log to either side, and hoist the same onto a car standing on the track. The movement inwardly, is assisted, if not entirely accomplished, by the tendency of said boom to assume a normal central position, owing to the securing of the guy or holding cable for said loading boom at a point ahead of the lower pivot of the boom. It should also be noted that in the construction of the skidding boom, considered by itself, several features of superior design and operative effect are found. Thus the carrying of the skidding blocks from a member movable relatively to the ends of the boom has recognized advantages; but heretofore this has always, so far as I am aware, involved bringing the guying and skidding lines so close as to frequently cause their entanglement or at least interfere with their free operation. In the present construction of boom, however, the skidding blocks are supported forwardly of the end of the boom, and by attaching the guy lines to the boom at points more or less spaced, or apart, from the points of attachment of said blocks all danger of this interference is practically obviated.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention—

1. In a machine of the character described, a boom oscillatory about an axis inclined from the vertical, substantially as described.

2. In a machine of the character described, the combination with a support, of a boom having its ends respectively pivotally secured thereto, the pivotal point for the upper end of said boom being located forwardly of that of its lower end.

3. In a machine of the character described, the combination of a suitable frame, a mast, a boom oscillatorily supported at its lower end upon said frame, and means connecting the upper end of said boom with said mast, said mast inclining so that the point of connection of said means therewith is located forwardly of the boom's lower end.

4. In a machine of the character described, the combination of a suitable frame, a mast, a boom oscillatorily supported at its lower end upon said frame, and a holding cable connecting the upper end of said boom with that of said mast, said mast inclining so that the point of connection of said cable therewith is located forwardly of said boom's lower end.

5. In a machine of the character described, the combination of a suitable frame, a mast, a beam oscillatorily secured to said frame near the base of said mast, an A-boom supported upon said beam, and means connecting the upper end of said boom with said mast, said mast inclining so that the point of connection of said means therewith is located forwardly of said beam's axis of oscillation.

6. In a machine of the character described, the combination of a suitable frame, a mast, a beam oscillatorily secured to said frame near the base of said mast, resilient means adapted to limit the oscillation of said beam about its pivotal axis, an A-boom supported upon said beam, and a holding cable connecting the upper end of said boom with that of said mast, said mast inclining so that the point of connection of said cable therewith is located forwardly of said beam's axis of oscillation.

7. In a machine of the character described, the combination of a suitable frame, a mast, a beam oscillatorily secured to said frame near the base of said mast, resilient means adapted to limit the oscillation of said beam about its pivotal axis, fluid-pressure actuated means connected with said beam and adapted to control such oscillation within the limits imposed by said resilient means, an A-boom supported upon said beam and a holding cable connecting the upper end of said boom with that of said mast, said mast inclining so that the point of connection of said cable therewith is located forwardly of said beam's axis of oscillation.

8. In a machine of the character described, the combination of a frame, a mast at one end of said frame, holding cables from said mast to the other end of said frame, a boom oscillatorily supported at its lower end upon said frame, and a holding cable connecting the upper end of said boom with that of said mast, said mast inclining outwardly so that the point of connection of said cable therewith is located forwardly of said boom's lower end.

9. In a machine of the character described, the combination of a frame, a mast at one end of said frame, holding cables from said mast to the other end of said frame, means for laterally guying said mast, a boom oscillatorily supported at its lower end upon said frame, and a holding cable connecting the upper end of said boom with that of said mast, said mast inclining outwardly so that the point of connection of said cable therewith is located forwardly of said boom's lower end.

10. In a machine of the character described, the combination of a frame, a mast at one end of said frame, holding cables from said mast to the other end of said frame, guying lines passing over the outer end of said mast and thence extending laterally in opposite directions, winding drums on said frame for drawing in said guying lines, a boom oscillatorily supported at its lower end upon said frame, and a holding cable connecting the upper end of said boom with that of said mast, said mast inclining outwardly so that the point of connection of said cable therewith is located forwardly of said boom's lower end.

11. In a machine of the character described, the combination of a frame, a mast at one end of said frame, holding cables from said mast to the other end of said frame, means bracing said mast against rearward movement, a boom oscillatorily supported at its lower end, and a holding cable connecting the upper end of said boom with that of said mast.

12. In a machine of the character described, the combination of a frame, a mast at one end of said frame, holding cables from said mast to the other end of said frame, means bracing said mast against rearward movement, a boom oscillatorily supported at its lower end upon said frame, and a holding cable connecting the upper end of said boom with that of said mast, said mast inclining outwardly so that the point of connection of said cable therewith is located forwardly of said boom's lower end.

13. In a machine of the character described, the combination of a frame, a mast at one end of said frame, holding cables from said mast to the other end of said frame, means bracing said mast against rearward movement, guying lines passing over the outer end of said mast and thence extending laterally in opposite directions, winding drums on said frame for drawing in said guying lines, a boom oscillatorily supported at its lower end upon said frame, and a holding cable connecting the upper end of said boom with that of said mast, said mast inclining outwardly so that the point of connection of said cable therewith is located forwardly of said boom's lower end.

14. In a machine of the character described, the combination of a suitable frame, a mast, a boom oscillatorily supported at its lower end upon said frame, means connecting the upper end of said boom with said mast, said mast inclining so that the point of connection of said means therewith is located forwardly of the boom's lower end, blocks carried by said mast and boom, respectively, and a loading line passing over said blocks.

15. In a machine of the character described, the combination of a suitable frame, an inclined mast, a boom oscillatorily supported at its lower end upon said frame, means connecting the upper end of said boom with said mast, a loading line, blocks therefor respectively carried by said boom and mast, other blocks carried by said mast, and skidding lines passing over said last-named blocks.

16. In a machine of the character described, the combination of a frame, a mast at one end of said frame, holding cables from said mast to the other end of said frame, means for laterally guying said mast, a boom oscillatorily supported at its lower end upon said frame, a holding cable connecting the upper end of said boom with that of said mast, said mast inclining outwardly so that the point of connection of said cable therewith is located forwardly of said boom's lower end, blocks carried by said mast and boom respectively, and a loading line passing over said blocks.

17. In a machine of the character described, the combination of a frame, an outwardly inclined mast at one end of said frame, holding cables from said mast to the other end of said frame, means for laterally guying said mast, a boom oscillatorily supported at its lower end upon said frame, a holding cable connecting the upper end of said boom with that of said mast, a loading line, blocks therefor respectively carried by said boom and mast, other blocks carried by said mast, and skidding lines passing over said last-named blocks.

18. In a machine of the character described, the combination of a suitable frame, an outwardly inclining skidding boom at one end of said frame, holding cables from said boom to the other end of said frame, and means bracing said boom against rearward movement.

19. In a machine of the character described, the combination of a suitable frame, an outwardly inclining skidding boom at one end of said frame, holding cables from said boom to the other end of said frame, and extensible but non-compressible means bracing said boom against rearward movement.

20. In a machine of the character described, the combination of a suitable frame, an outwardly inclining skidding boom at one end of said frame, holding cables from said boom to the other end of said frame, and means bracing said boom against rearward movement, said means comprising rods pivotally connected at their respective ends to said boom and to said frame.

21. In a machine of the character described, the combination of a suitable frame, an outwardly inclining skidding boom at one end of said frame, holding cables from said boom to the other end of said frame, and means bracing said boom against rearward movement, said means comprising rods extending from points intermediate of the ends of said boom to said frame and sockets pivoted to said boom and frame and slidably retaining the ends of said rods.

22. In a machine of the character described, the combination of a suitable frame, an outwardly inclining skidding boom at one end of said frame, holding cables from said boom to the other end of said frame, means bracing said boom against rearward movement, and means for laterally guying said boom.

23. In a machine of the character described, the combination of a suitable frame, an outwardly inclining skidding boom at one end of said frame, holding cables from said boom to the other end of said frame, extensible but non-compressible means bracing said boom against rearward movement, and guying lines passing over the outer end of said boom and thence extending laterally in opposite directions.

24. In a machine of the character described, the combination of a suitable frame, an outwardly inclining skidding boom at one end of said frame, holding cables from said boom to the other end of said frame, means bracing said boom against rearward movement, said means comprising rods extending from points intermediate of the ends of said boom to said frame and sockets pivoted to said boom and frame and slidably retaining the ends of said rods, guying lines passing over the outer end of said boom and thence extending laterally in opposite directions, and winding drums on said frame for drawing in said guying lines.

25. In a machine of the character described, the combination of a suitable frame, an outwardly inclining skidding boom at one end of said frame, two holding cables extending from the outer end of said boom to the other end of said frame, and a transverse member interposed between said cables to spread the same.

26. In a machine of the character described, the combination of a boom, a block supported from, but transversely movable of, the end of said boom, a cable passing over said block, and guying means attached to said boom at a point spaced from the point of attachment of said block.

27. In a machine of the character described, the combination of a boom, a block located forwardly of the end of said boom, and means mounted upon said boom movably supporting said block.

28. In a machine of the character described, the combination of a boom, a block located forwardly of the end of said boom, means mounted upon said boom movably supporting said block, and guying means attached to the end of said boom at a point spaced from the point of attachment of said supporting means.

29. In a machine of the character described, the combination of a boom, a member located forwardly of the end of said boom, links pivoted to said boom and movably supporting said member in such position, a block suspended from said member, and guying means attached to the end of said boom to the rear of said links.

30. In a machine of the character described, the combination of a boom, a member located forwardly of the end of said boom, links pivoted to said boom and constituting brackets movably supporting said member in such position, and a block suspended from said member.

31. In a machine of the character described, the combination of a boom, a member located forwardly of the end of said boom, links pivoted to said boom and constituting brackets movably supporting said member in such position, a block suspended from said member, and guying means attached to the end of said boom at points spaced from the points of attachments of said links.

32. In a machine of the character described, the combination of an A-boom having a squared end, a transversely disposed member located forwardly of the end of said boom, links pivoted to such boom end and constituting brackets movably supporting said member in such position, a block suspended from said member, and guy lines attached to each side of such boom end and thence extending in opposite directions.

33. In a machine of the character described, the combination of a skidding boom, a loading boom projecting forwardly of said skidding boom, two blocks carried by the latter, skidding lines passing over said blocks respectively, and thence extending in opposite directions, a block carried by said loading boom, and a loading line passing between said skidding lines and over said last named block.

34. In a machine of the character described, the combination of a skidding boom, a loading boom projecting forwardly of said skidding boom, two blocks carried by the latter, skidding lines passing over said blocks respectively, and thence extending in opposite directions, a block carried by said loading boom, a loading line passing between said skidding lines and over said last-named block, and a guide-block for said loading line mounted in said skidding boom.

35. In a machine of the character described, the combination of a frame, an outwardly inclined skidding boom at one end of said frame, a loading boom oscillatorily supported at its lower end upon said frame and projecting beyond said skidding boom, two blocks carried by the latter, skidding lines passing over said blocks respectively, and thence extending in opposite directions, a block carried by said loading boom, a loading line passing between said skidding lines and over said last-named block, and a guide-block for said loading line mounted in said skidding boom.

36. In a machine of the character described, the combination of a frame, an outwardly inclined skidding boom at one end of said frame, a loading boom oscillatorily supported at its lower end upon said frame and projecting beyond said skidding boom, a member located forwardly of the end of said skidding boom, links pivoted to the latter and movably supporting said member in such position, two blocks suspended from said member, skidding lines passing over said blocks respectively and thence extending in opposite directions, guying means attached to the end of said skidding boom at points spaced from the points of attachment of said links, a block carried by said loading boom, a loading line passing over said last-named block, and a guide-block for said loading line in said skidding boom.

37. In a machine of the character described, the combination of a frame, an outwardly inclined skidding boom at one end of said frame, said boom being of A-shape with a squared end, holding cables from the outer end of said boom to the other end of said frame, a loading boom of A-shape oscillatorily supported at its lower end upon said frame and projecting beyond said skidding boom, a holding cable connecting the outer end of said loading boom with that of said skidding boom, two blocks carried by the latter, skidding lines passing over said blocks respectively, and thence extending in opposite directions, a block carried by said loading boom, a loading line passing between said skidding lines and over said last-named block, and a guide-block for said loading line mounted in said skidding boom.

38. In a machine of the character described, the combination of a frame, an outwardly inclined skidding boom at one end of said frame, said boom being of A-shape with a squared end, holding cables from the outer end of said boom to the other end of said frame, a loading boom of A-shape oscillatorily supported at its lower end upon said frame and projecting beyond said skidding boom, a holding cable connecting the outer end of said loading boom with that of said skidding boom, a transversely disposed member located forwardly of the end of said skidding boom, links pivoted to such boom end and constituting brackets movably supporting said member in such position, skidding lines passing over said blocks respectively, and thence extending in opposite directions, a block carried by said loading boom, a loading line passing between said skidding lines and over said last-named block, and a guide-block for said loading line mounted in said skidding boom.

39. In a machine of the character described, the combination of a frame, an outwardly inclined skidding boom at one end of said frame, said boom being of A-shape with a squared end, holding cables from the outer end of said boom to the other end of said frame, a loading boom of A-shape oscillatorily supported at its lower end upon said frame and projecting beyond said skidding boom, a holding cable connecting the outer end of said loading boom with that of said skidding boom, a transversely disposed member located forwardly of the end of said skidding boom, links pivoted to such boom end and constituting brackets movably supporting said member in such position, guy lines attached to said skidding boom to the rear of such end, two blocks carried by said member, skidding lines passing over said blocks respectively, and thence extending in opposite directions, a block carried by said loading boom, a loading line passing between said skidding lines and over said last-named block, and a guide-block for said loading line mounted in said skidding boom.

Signed by me this 11th day of September, 1909.

JOHN R. McGIFFERT.

Attested by—
J. J. LUMM,
C. A. CUSTER.